United States Patent Office 3,426,996
Patented Feb. 11, 1969

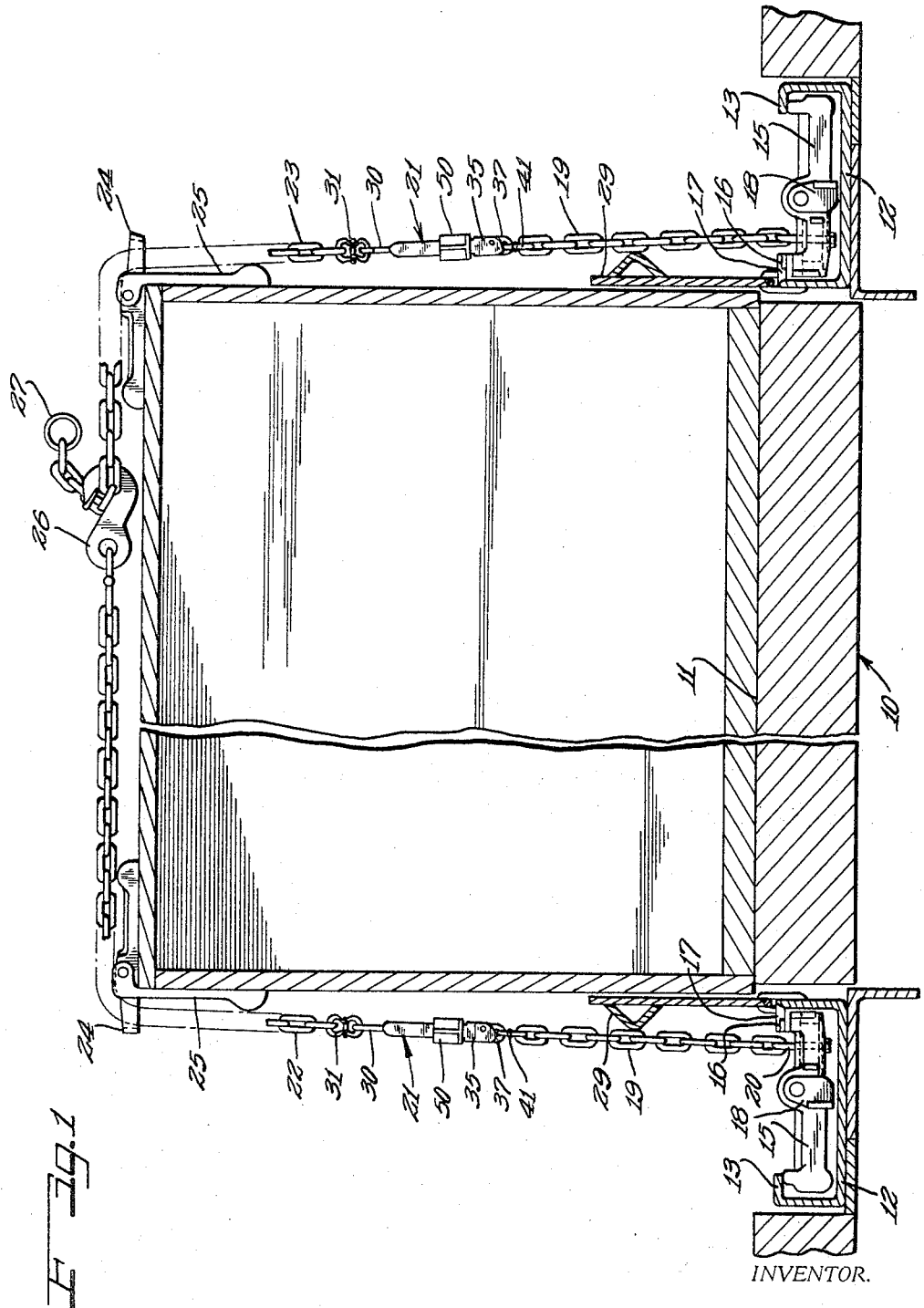

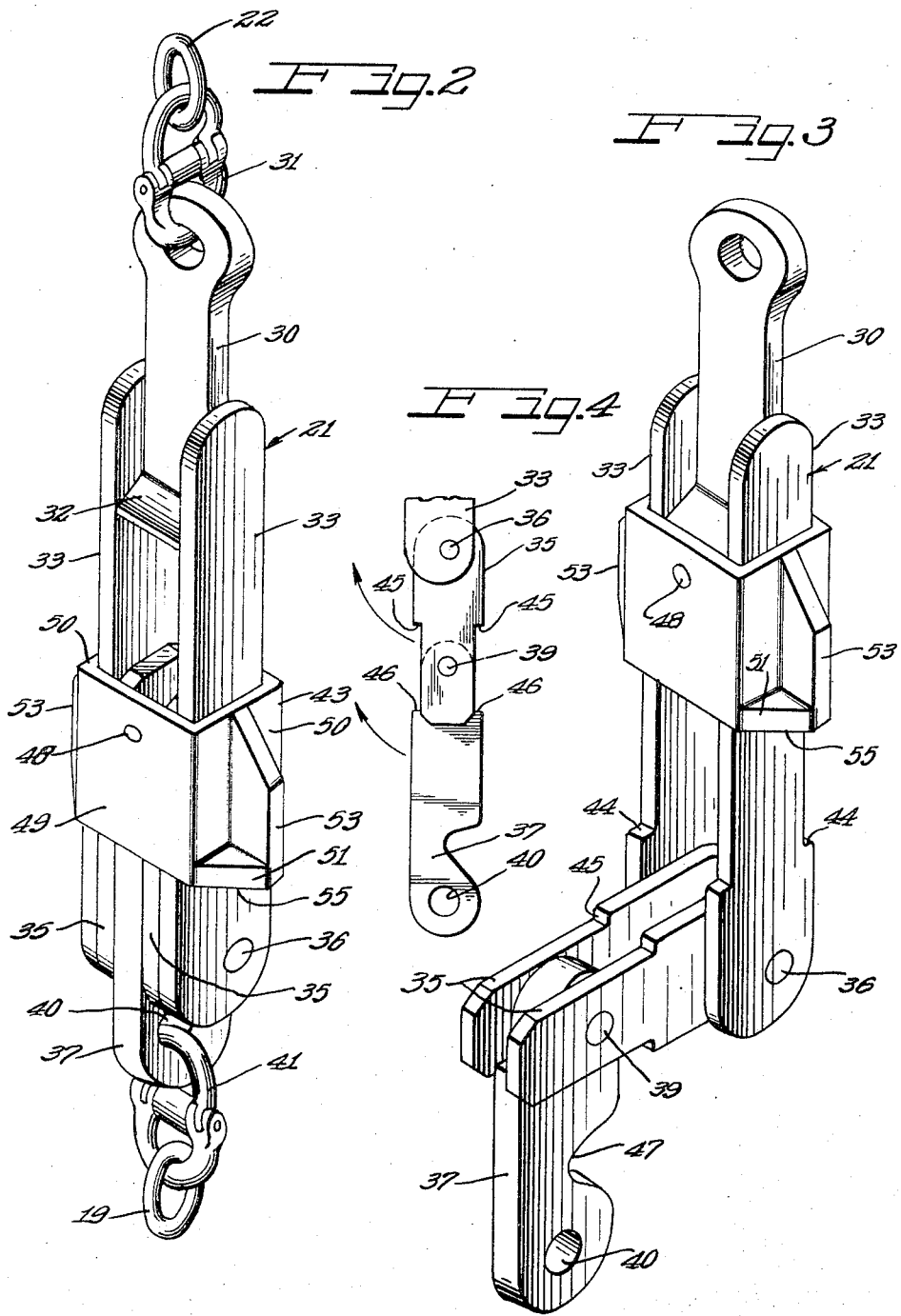

3,426,996
FLEXIBLE TIE DOWN FOR FLAT LADING AND QUICK RELEASE THEREFOR
Keith W. Broling, Olympia Fields, Ill., assignor, by mesne assignments, to Portec, Inc., Chicago, Ill., a corporation of Delaware
Filed Dec. 23, 1966, Ser. No. 604,374
U.S. Cl. 248—361      7 Claims
Int. Cl. B65j 1/22; B65d 63/00

ABSTRACT OF THE DISCLOSURE

Quick release for the tie down chains, tying lading to the flat deck of a vehicle. The quick release consists essentially in a releasable connecting link including an upper connector depending from the upper strand of a tie down chain on one side of the vehicle and extensible release links pivotally connected to the lower end of the upper connector, and foldable upwardly along and extensible from said upper connector. The links are held in their folded or retracted aligned position by a sleeve slidably movable along the upper connector and released by an upward blow on the sleeve. The pivot for the release links to the upper connector is eccentric of the longitudinal axis of the connector to effect the exertion of a sidewise force on the sleeve by the tension of the tie down chain, to prevent the sleeve from vibrating out of its locking position during travel of the vehicle.

BACKGROUND OF THE INVENTION

The quick tension release of the present invention is particularly adapted for tie down systems for flat wall board and like materials. In the particular form of tie down shown, power take ups are provided to take up tension on strands of chains extending from tie down anchors releasably anchored to the sides of the load, and extending along the sides of the load and over the top and hooked together when under the required tension. The quick release enables tension to be released by the simple blow of a hammer and thereby enables the tie down chains to be quickly unhooked to unload the load in a minimum amount of time. This is of a particular advantage when it is considered that there may be as many as 20 tie down chains extending over the load on a standard freight car.

Previously, tension has usually been taken up on the strands of chain holding down a load by a turnbuckle, by an over center toggle linkage take up or other load binding mechanisms. The turnbuckle requires both time and manual effort to release tension from the chain so that the tie down can be released, while the over center toggle oftentimes does not pull the chain as taut as required to efficiently hold down a load, rendering it difficult to attain sufficient tension in the chain, to prevent the load from slipping. Operation of the toggle also requires considerable manual effort, which is objectionable.

OBJECTS AND SUMMARY OF INVENTION

In carrying out the invention, I provide an extensible connector link in the form of a series of links retractible into aligned relation with respect to each other and held on their retracted aligned positions by a sleeve slidably movable along the links and released by the blow of a hammer, to release the connector and tension on the chain.

A principal object of the present invention, therefore, is to provide a simple form of extensible connector link for maintaining tension on a tie down chain tying a load to a flat car, in which release of tension is effected by the blow of a hammer.

Another object of the invention is to provide a simple and improved form of quick release for the tie down chains tying lading to flat cars or the like, facilitating release of the chains by a simple release operation, and thereby reducing the time and manual effort heretofore required to release the load.

A still further object of the invention is to provide a simple form of articulated connector link for a tie down chain, holding the chain under tension, in which the connector link is in the form of a series of link sections pivoted together, to be folded along each other into a retracted position, and held in a folded retracted tension maintaining position by a simple form of slidable sleeve, released by the blow of a hammer.

These and other objects of the invention will appear from time to time as the following specification proceeds and with reference to the accompanying drawings.

Description of the drawings

FIGURE 1 is a fragmentary generally diagrammatic transverse sectional view taken through a loaded freight car, showing the tie down chains extending over the load under tension and showing quick releases constructed in accordance with the principles of the present invention in the strands of chain extending along opposite sides of the load;

FIGURE 2 is a perspective view of the quick release shown in FIGURE 1, showing the release in its retracted position;

FIGURE 3 is a perspective view of the release shown in FIGURE 2, showing the release moving downwardly to a release position, to release tension from the tie down chain; and FIGURE 4 is a fragmentary side view of the lower portion of the release, showing the release in its extended position.

DESCRIPTION OF THE PREFERRED EMBODIMENT OF THE INVENTION

FIGURE 1 of the drawings shows a cross-section through a loaded vehicle, which may be a flat car, a trailer or truck having a flat deck 11. The deck 11 is preferably made of wood and has retaining channels 12, 12 recessed therein adjacent opposite sides thereof and extending between the bulk heads (not shown) of the car, at opposite ends of the car, and retaining the lading from longitudinal shiftable movement along the car.

Each retaining or anchoring channel 12 has retainer flanges 13 extending inwardly of the parallel legs thereof and along opposite sides thereof. The retainer flanges 13, 13 are engaged along their under-surfaces by tie down anchoring devices 15, 15, when in anchoring positions. The tie down anchoring devices are like those shown in my application Ser. No. 510,605, filed Nov. 30, 1965, and entitled "Tie Down for Wall Board and the Like." Lugs 16, 16 extend upwardly from the sides of said anchoring devices through slots 17, 17 in the inner retainer flanges 13, and locked from disengagement with said slots, upon the release of tension from the chains, by locking devices 18.

As shown in FIGURE 1, a strand of tie down chain 19 is anchored to an associated tie down anchoring device 15, as by a U-bolt 20 and is connected at its upper end to an extensible tie down connectoor link 21, constructed in accordance with the principles of the present invention. The tie down connector link 21 is connected with a strand of chain 22 at its upper end, which extends upwardly through an eye 24 of a load protector 25, over the top of the load and has a hook 26 in its end. The hook is hooked to a link of a strand of chain 23 extending upwardly of the quick release tie down connector link 21 on the opposite side of the car. The strand of chain 23, extending along the right hand side of the load, is shown having a ring 27 on its free end, but is otherwise similar to the strand of chain 22 on the left hand side of the car.

In connecting the strands of chain 19 and 22 to extend upwardly along and over the car, the strands of chain 19 are retained away from the load by upwardly opening doors 29, hinged to the inner sides of the channels 12. The doors 29 are provided not only to protect the load from the tie down chains and guide the chains upwardly along the load, but also to accommodate the chains 19 and 22 on the associated connector link 21 as well as the corner protector 25 to be stored in the channels, when not in use. The doors 29 may thus be closed over the channels to protect the tiedown anchoring devices and chains, as well as to provide surfaces over which trucks and the like may move, when loading and unloading in the freight car, as has clearly been shown and described in my application Ser. No. 510,605 and are no part of the present invention so need not herein be shown or described further.

In training the tie down chains over a load, the tie anchoring devices 15 are moved in position along the channels 12 and elevated to engage the lugs 16 within the slots in the channels. The locks 18 will then move downwardly by gravity to their locking positions, to retain the tie down anchoring devices in position in the channels. When the anchoring devices are in place, the tie down anchoring chains are trained upwardly along opposite sides of the load in engagement with the doors 29, with the releasable connector links 21 in retracted positions, and the load protectors 25 placed along the corners of the load. Power operated tension devices may be attached to the ends of the chains, to bring the chains under sufficient tension to prevent shifting of the load, at which time the hook 26 of one strand of chain 22 is connected with a link of the next adjacent strand of chain 23. The tensioning devices for the chain may be power operated winches or ratcheting take ups connected to the ends of the strands of chain and are no part of the present invention so need not herein be shown or described further.

Referring now in particular to the quick releasable connector links 21, and certain of the novel features of the invention, each releasable connector link 21 includes an upper connector 30 having an eye extending through the upper portion thereof and connected to a clevis 31, connected to an end link of the strand of chain 22. The upper connector 30 is in the form of a bar having an outwardly flared base 32. The lower portion of the bar 30 extends along the insides of parallel spaced straps 33, 33 depending from said upper connector 30. A pair of parallel spaced release links 35 is pivotally connected within the straps 33 by a pivot pin 36 disposed eccentric of the longitudinal vertical centers of said straps. The release links 35 extend within the straps 33 and form a pivotal mounting adajcent their lower ends for a lower connector link 37, extending between the release links 35, and pivotally connected thereto by a pivot pin 39. The lower connector link 37 has an eye 40 leading therethrough having a clevis 41 extending therethrough, and connected thereto to depend therefrom. The clevis 41 in turn is connected with an upper end link of the lower strand 19.

The straps 33 have a rectangular sleeve 43 mounted thereon from the top thereof, and slidably movable therealong into engagement with shouldered stops 44 at the lower end portions of said straps. The extensible release links 35 have similar shouldered stops 45 registering with the stops 44 when the release links 35 are hinged upwardly along the insides of the straps 33.

The lower connector link 37 has a notch 47 formed thereon for engagement with the pivot pin 36, when the lower link is in its retracted position shown in FIGURE 2, to accommodate the lower connector link to be pivoted inwardly into alignment with the straps 33, 33 and the release links 35, 35. The upper portion of the lower connector link 37 is of the same width as the upper portions of the straps 33 and the lower portions of the release links 35, and terminates into shoulders 46, registering with the shouldered stops 44 and 45 when the connector link is in its retracted position.

Thus when the release links 35, 35 and connector link 37 are pivoted upwardly along the straps 33, the rectangular sleeve slides downwardly along said straps and along the release links 35 into engagement with the shouldered stops 44, 45 and 46. The connector will then be locked in its retracted position.

The rectangular sleeve 43 has a stop pin 48 mounted in the side wall 49 thereof for engagement with the underside of the outwardly flared base 32 of the upper connector 30, to limit slidable movement of said sleeve along the straps 33, 33. The stop pin 48 may be inserted in position after the sleeve 43 has been assembled to the straps 33, 33. The sleeve 43 also has opposite side walls 50, 50 having an abutment 51 extending outwardly from the lower end thereof along a vertically extending reinforcement flange or gusset 53, extending upwardly along the center of the side wall 50. The underside of the abutment 51 and flanged reinforcement 53 provide a downwardly facing abutment surface 55 adapted to receive the blow of a hammer, or like tool, to release the sleeve 43 and move the sleeve upwardly to release the release links 35, and thereby accommodate a quick release of the connector and a consequent release of tension in the strands of chain 19 and 22, connected with opposite ends of the connector 21.

The pivot pin 36, as previously described, is shown as eccentric of the longitudinal centers of the straps 33, 33. This eccentricity of a pivot pin 36 forms an eccentric mounting for the release links 35, 35 and the lower connector link 37. Thus as tension is taken up on the strands of chain 19 and 22, a slight pressure will be exerted by the release links 35, 35 and lower connector link 37 against the inside of the rectangular sleeve 43.

It may be seen from the foregoing that a simplified form of quick releasable link has been provided for connection in each takeup chain of a tie down for lading, that the link is retracted into a tension maintaining position and is retained in this position by a sleeve extending along the upwardly and inwardly folded release links 35 and the aligned inwardly folded connector link 37, and that the connector is locked in its retracted tension maintaining position by a sliding of the sleeve along the inwardly folded links, and is maintained in this locked position by the over-center pivot for the release and connector links exerting a continual pressure on the sleeve, as long as tension is maintained on the chains.

It may further be seen that the link may be instantaneously released by the blow of a hammer on the underside of the locking sleeve, knocking the locking sleeve into a release position.

While I have herein shown and described one form in which the invention may be embodied, it may readily be understood that various variations and modifications in the invention may be attained without departing from the spirit and scope of the novel concepts thereof.

I claim as my invention:

1. In a tie down chain adapted to tie down lading to the flat deck of a vehicle, including two aligned strands of chain and a quick releasable connector link connecting said strands of chain together, to form a continuous tie down chain maintained under tension, said quick releasable connector including an elongated upper connector, connected with an end of an upper of said strands of chain, a release link pivotally connected to said connector adjacent the lower end thereof and pivotally movable upwardly along said upper connector link into a retracted position, a lower connector link fixedly pivoted to said release link adjacent the lower end thereof and depending therefrom, for connection with the other strand of chain and pivotally movable into a retracted position alongside said release link and in alignment therewith, and a sleeve slidably movable downwardly along said upper connector link, said release link and said lower connector link upon retractable movement of said release link and lower connector link into aligned relation with respect to said upper connector, and biased by gravity to move downwardly along said links and lock said release link and said lower connector link in a retracted tension maintaining position, said sleeve having a downwardly facing abutment surface adapted to be released by an upward blow thereon.

2. The structure of claim 1,
wherein the release link is pivotally connected to the lower end of the upper connector link for movement about a transverse axis eccentric of the longitudinal axis of said upper connector link, to effect the exertion of pressure by said release link and said lower connector link laterally along said sleeve, by the tension exerted on said lower connector link.

3. The structure of claim 1,
wherein a transverse pivot pin is provided to connect said release link to said upper connector adjacent the lower end thereof,
wherein the axis of said pivot pin is eccentric of the longitudinal center of said upper connector,
wherein the lower connector link has a recess therein, registrable with said pivot pin and accommodating the alignment of said connector, said release link and said lower connector link in the retracted position of the connector, whereby said sleeve may slidably move downwardly along said upper connector, said release link and said lower connector link and lock said release and connector links in aligned relation with respect to each other and with respect to said upper connector, the eccentric pivot pin offsetting the centers of said release link and said lower connector link from the longitudinal center of said upper connector link to effect the exertion of lateral pressure on said sleeve by both of said links, to thereby hold said sleeve from vibrating to a release position.

4. The structure of claim 3,
wherein the upper connector comprises an apertured connector bar having straps extending along opposite sides thereof and downwardly therefrom in parallel relation with respect to each other,
wherein the release link comprises a pair of parallel links extending along the insides of said straps and pivotally connected thereto adjacent the lower ends of said straps,
wherein said lower connector link is transversely pivoted between said release links, to depend therefrom and to accommodate said release links and lower connector link to be pivoted upwardly along the insides of said straps in alignment therewith, and
wherein the locking sleeve is a rectangular sleeve slidably mounted on said straps for movement therealong by gravity into locking engagement with said release link and said lower connector link, to hold said release link and lower connector link in aligned relation with said straps.

5. The structure of claim 4,
wherein the transverse pivotal connection between the straps and the release link is a pivot pin positioned eccentric of the longitudinal axes of said straps and adjacent the lower ends thereof, and
wherein the pivotal connection between said lower connector link and said straps is a transverse pivot pin disposed midway between opposite sides of said straps and in alignment with the center of said eccentrically positioned pivot pin connecting said release links to said straps, to assure lateral pressure against the inside of said sleeve by said release link and said lower connector link by the offset positions of said aligned pivot pins with respect to the longitudinal center line of said straps when said connector is in a retracted position, as tension is taken up on said strands of chain.

6. The structure of claim 5,
wherein said straps and said release links have upwardly facing aligned stop shoulders when said release links are folded upwardly along the insides of said straps to limit downward movement of said rectangular sleeve, and
wherein said lower connector link has a recess therein, registrable with said eccentrically located pivot pin, connecting said straps to said release links, and accommodating the nesting of said release links and lower connector in aligned relation with respect to said straps.

7. The structure of claim 6,
wherein said lower link has a reduced upper end portion of the same width as the width of said release link and said straps above the shouldered portions of said straps, to accommodate said sleeve to be slidably moved downwardly along said release links and said lower connector link, and
wherein said lower connector link has outwardly extending stop shoulders defining the lower margins of the reduced upper end portion thereof, and in general alignment with said shoulders on said release links and straps, when said connector is in a retracted tension maintaining position.

References Cited

UNITED STATES PATENTS 2,500,488  3/1950  Durbin et al. _____ 254—78

FOREIGN PATENTS 413,002  7/1910  France.

CHANCELLOR E. HARRIS, *Primary Examiner.*

J. FRANKLIN FOSS, *Assistant Examiner.*

U.S. Cl. X.R.

24—68; 254—78